United States Patent [19]

Eastin

[11] Patent Number: 4,818,494
[45] Date of Patent: Apr. 4, 1989

[54] APPARATUS FOR MANUFACTURING NITROGEN FERTILIZER SOLUTIONS

[76] Inventor: John A. Eastin, P.O. Box 389, Grant, Nebr. 69140

[21] Appl. No.: 122,481

[22] Filed: Nov. 10, 1987

Related U.S. Application Data

[60] Continuation of Ser. No. 9,564, Jan. 28, 1987, abandoned, which is a continuation of Ser. No. 691,742, Jan. 15, 1985, abandoned, which is a continuation-in-part of Ser. No. 507,166, Jun. 23, 1983, Pat. No. 4,511,389, which is a division of Ser. No. 379,466, May 18, 1982, Pat. No. 4,435,201, which is a continuation-in-part of Ser. No. 100,825, Dec. 6, 1979, abandoned, which is a continuation of Ser. No. 824,289, Aug. 15, 1977, abandoned, which is a continuation of Ser. No. 728,788, Oct. 1, 1976, abandoned, which is a division of Ser. No. 581,050, May 7, 1975, abandoned.

[51] Int. Cl.$^4$ ............................ B01J 8/04; B01J 14/00
[52] U.S. Cl. ................................... 422/191; 422/189; 422/311; 423/392
[58] Field of Search ............... 422/171, 177, 191, 197, 422/311, 189, 193; 423/239, 392, 576; 261/94, 114

[56] References Cited

U.S. PATENT DOCUMENTS

| | | | |
|---|---|---|---|
| 822,373 | 6/1906 | Knietsch | 423/239 |
| 2,468,044 | 4/1949 | Davis | 422/311 |
| 3,003,640 | 10/1961 | Pearce | 422/191 |
| 3,425,810 | 2/1969 | Scott, Jr. | 422/191 |
| 3,453,071 | 7/1959 | Schmitt et al. | |
| 3,506,396 | 4/1970 | Van Dyk et al. | 423/392 |
| 3,515,520 | 6/1970 | Hervert | 422/191 |
| 3,542,510 | 11/1970 | Newman et al. | 423/392 |
| 3,595,626 | 7/1971 | Sowards | 422/191 |
| 3,615,199 | 10/1971 | Terrana | 422/191 |
| 3,647,360 | 3/1972 | Jaeger | 422/161 |
| 3,949,057 | 4/1976 | Gilbert, Jr. | 423/393 |
| 3,978,004 | 8/1976 | Daamas et al. | 423/576 |
| 4,151,265 | 4/1979 | Ethington | 423/396 |
| 4,219,534 | 8/1980 | Ethington | 423/235 |
| 4,219,536 | 8/1980 | Hoerke | 423/393 |
| 4,331,630 | 5/1982 | Pool | 422/189 |

OTHER PUBLICATIONS

Shell Data Survey—1954 Ed. pp. HCl to Hypochlorous Acid.

Primary Examiner—Michael S. Marcus
Attorney, Agent, or Firm—Vincent L. Carney

[57] ABSTRACT

To make and use nitrogeneous fertilizer on a farm, nitrogen oxides are prepared in a continuous process from air or from ammonia in a reactor, with the ammonia either being transported to the farm or local site in a farming area or being prepared on the site in a continuous process from water and air. The nitrogen oxides are mixed with a continuous flow of water to form a solution of nitric acid, which may be applied to the field through the irrigation system as top dressing or mixed within the system with ammonium or other cations to form ammonium nitrate or other desired nitrogen solutions for application to the fields in a continuous process or concentrated without requiring storage of large amounts of gas or creating heat exchange problems in the manufacturing process. In the preferred embodiment which burns commercially supplied ammonia, the nitrogen oxides are: (1) contacted with an 8 percent nickel stainless steel mesh which fixes nitrogen oxide on nickel sites in a column 10 feet high and 1 foot in diameter; (2) while fixed, contacted with oxygen from air flowing in the column concurrently with the nitrogen oxides; and (3) oxidized, while fixed, to nitrogen dioxide. The nitrogen dioxide is dissolved and reacted in water flowing countercurrently through the mesh to form nitrate.

17 Claims, 5 Drawing Sheets

APPARATUS FOR MANUFACTURING NITROGEN FERTILIZER SOLUTIONS

RELATED CASES

This is a continuation of U.S. patent application Ser. No. 07/009,564, filed Jan. 15, 1985, abandoned, which is a continuation of U.S. patent application Ser. No. 06/691,742, filed Jan. 15, 1985 abandoned, which is a continuation-in-part of U.S. application Ser. No. 507,166 to John Eastin, filed June 23, 1983 on MANUFACTURING AND USING NITROGEN FERTILIZER SOLUTIONS ON A FARM, now U.S. Pat. No. 4,511,389, issued Apr. 16, 1985, which is a divisional of U.S. patent application Ser. No. 379,466, filed May 18, 1982, now U.S. Pat. No. 4,435,201, issued Mar. 6, 1984, which is a continuation-in-part of U.S. patent application Ser. No. 100,825, filed Dec. 6, 1979, now abandoned, which is a continuation of Ser. No. 824,289 filed Aug. 15, 1977, now abandoned, which is a continuation of Ser. No. 728,788, filed Oct. 1, 1976, now abandoned, which is a divisional of Ser. No. 581,050, filed May 7, 1975 and now abandoned.

BACKGROUND OF THE INVENTION

This invention relates to methods and apparatus for producing nitrogen fertilizer solutions.

It is known that ammonium and nitrate ions are the major nitrogen forms absorbed by plant roots. It has been described in *Biological Review*, 1978, 55:465-510, that each ion may produce different yield and physiological responses within plant cropping systems. Moreover, certain common crops and categories of different crops respond to different ratios of the two ions in the soil solution by providing increased plant growth and yield when the proper ion ratio exists in the soil solution during the crop growth period. For example, corn grows most rapidly with a 1:3 ammonium:nitrate ion ratio in a normal temperature soil solution while tomatoes grow most efficiently with a large preponderance of nitrate nitrogen in the soil solution.

It is thus known to be beneficial to apply nitrate fertilizers to crops and to exercise control of the ammonium:nitrate ion ratio in the soil solution of a particular crop in accordance with that crop's needs.

The nitrogen fertilizer industry, in most countries, uses anhydrous ammonia as a principal component. This is because anhydrous ammonia: (1) has relatively low initial cost; (2) is the raw material for other synthetic nitrogen fertilizers; (3) has high nitrogen content, the content being approximately 82 percent by weight; and (4) has physical characteristics which make long distance pipeline, rail and truck transport efficient.

Because anhydrous ammonia is a liquefied gas, it has several disadvantages under some circumstances, such as: (1) requiring special storage and handling facilities which are so expensive as to limit storage of anhydrous ammonia at the farm level and the local retail level; (2) requiring specialized subsurface application equipment to avoid ammonia loss at application time; (3) not being suitable for application in irrigation waters because it results in calcium carbonate deposits on the irrigation equipment and prohibitive amounts of fertilizer nitrogen are lost to the atmosphere through voltilization; (4) the time during a cropping season when it can be applied is limited because of the subsurface application requirements; and (5) because it must be applied at certain times, logistical problems and economic burdens are created in the industry.

One of the economic problems occurs because many soils, and especially coarser irrigated soils, cannot hold enough nitrogen applied as a single preplant ammonia application to sustain economic crop yields. Thus, it is necessary to apply split applications of nitrogen fertilizer. The time during the crop cycle when ammonia can be side dressed as a split application is limited by the growth of the crop plants because the operation requires knifing the ammonia gas into the soil.

It is known to use non-pressure nitrogen solutions to reduce some of these difficulties because they adapt readily to simple handling, storage and application methods. Moreover, the application of non-pressure fertilizer nitrogen solutions can be accomplished in concert with crop needs and this elicits a better crop growth response for each unit of applied nitrogen than the normal method of applying nitrogen in a concentrated ammonia band in the soil at the beginning of or shortly after the start of a crop cycle.

Non-pressure nitrogen solutions can be applied so the crop as a top dressing mechanically or in water used to irrigate the crop so it can be applied in a practical manner as the crop needs nitrogen.

However, non-pressure nitrogen solution fertilizers manufactured and applied by prior art techniques have a disadvantage in that a delivered unit of nitrogen as non-pressure nitrogen solution costs nearly double that for nitrogen as anhydrous ammonia. There have been many prior art attempts to reduce the cost of non-pressure nitrogen solutions.

In the prior art, one commercial system for providing non-pressure nitrogen fertilizer solutions for farm use consists of producing a relatively concentrated ammonium nitrate solution and blending it with a urea solution for shipment to dealers with subsequent distribution to and use at the farm level. The normal solution sold to the farmer contains from 28 percent to 32 percent nitrogen by weight, which is a low concentration product for long distance transportation. It must also be handled through a multi-tier distribution system, thus increasing cost.

The ammonium nitrate solution is produced by oxidizing ammonia with air, in the presence of a catalyst, to nitrogen oxide, oxidizing the nitrogen oxide to nitrogen dioxide and absorbing the nitrogen dioxide in water to produce nitric acid. In some prior art embodiments, this process is carried out at high pressure to make the desired acid concentration and reduce the size of the nitrogen oxide conversion and absorption system. Some systems include 30 to 35 stages of oxide conversion and absorption. In some systems, the concentrated nitric acid is reacted with ammonia to form an ammonium nitrate solution.

The commercial processes have the disadvantages of: (1) being expensive; (2) having considerable air pollution hazard; and (3) resulting in an expensive product. The cost of the product is increased for several reasons, such as: (1) the cost of making concentrated nitric acid and concentrated urea solutions is high; (2) there is cost in controlling atmospheric pollution; (3) there are substantial raw material losses in the manufacturing process; and (4) transporting and distributing a low concentration 28 percent to 32 percent nitrogen product over long distances to market is expensive.

In another prior art process, nitrogen is separated from the exhaust of tractors or other engines on a farm and the nitrogen is used as top dressing or for combination with other materials to form nitrogenous fertilizers. These processes are described in U.S. Pat. Nos. 2,943,419; 2,947,112 and 3,099,898.

These processes have the disadvantages of: (1) being limited to the amount of fertilizer obtainable; (2) being obtainable at only certain times; (3) producing undesirable nitrite nitrogen in the end product; (4) being limited in capacity to produce specific fertilizer nitrogen forms for cropping situations where that is desired; (5) being limited in the amount of fertilizer that can be produced economically by the amount of exhaust available from tractors or other engines while they are used for other purposes and being obtainable only after such use unless fuel is wasted by using the tractors or engines only to produce exhaust; and (6) requiring expensive and complicated apparatus to effect their reduction to practice.

Still another prior art process uses a multipurpose irrigation-hydroelectric project as: (1) a base for manufacturing nitrogen solution fertilizer; (2) a vehicle for delivering said fertilizer to farms; (3) a means for correcting soil and water alkalinity problems of irrigated farms with nitrogen fertilizer; and (4) a means of fertilizing irrigated crops with nitrogen fertilizer.

The hydroelectric power not used for normal community use is used to prepare ammonia in a conventional manner. The ammonia is then partially oxidized, the remainder of the gas stream is mixed with the oxides formed in the partial oxidation and the mixture is absorbed in water to make a nitrogen solution fertilizer. Alternatively, electricity is used to make nitrogen oxides by the electric arc process and the oxides of nitrogen treated to make nitrogen solution fertilizer. This process is described in U.S. Pat. Nos. 2,028,172 and 2,088,869.

This process has the disadvantages of: (1) not being suitable for use on individual farms or local sites serving only a few farms and thus being limited in application; (2) causing some damage in use; and (3) being inefficient in several respects.

Firstly, the process of U.S. Pat. Nos. 2,028,172 and 2,088,869 is not suitable for use on individual farms or local sites serving only a few farms and thus is limited in application for several reasons, such as: (1) it is applicable only to large-scale, multi-purpose irrigation-hydroelectric projects; (2) it requires large-scale, multi-purpose dam sites for water and power and thus consideration of too large a number of individual farm's separate needs; (3) it does not permit practical tailoring of the ions produced to specific crop needs unless the same crop is used over a wide area which causes difficulties with diseases and insects; and (4) it requires the handling and conversion of nitrogen oxides at a central irrigation-hydroelectric dam site.

Secondly, the process of U.S. Pat. Nos. 2,028,178 and 2,088,869 causes damage in use because: (1) it causes extensive groundwater pollution; (2) it requires the transportation in open ditches of corrosive and environmentally dangerous materials over long distances; and (3) it produces nitrites in the end product in concentrations that are harmful when applied to crops.

Thirdly, the process of U.S. Pat. Nos. 2,028,178 and 2,088,869 is inefficient because: (1) it has large fertilizer losses in transit; (2) it provides a low yield of usable nitrate ions; (3) it converts oxides to nitrates in (a) conventional trickle towers which are large if operated at atmospheric pressure or expensive if operated at conventional high pressure; (b) turbine infall or outfall which results in prohibitive nitrogeneous raw material losses in the form of nitrogen oxides gas loss to the atmosphere; or (c) irrigation ditches which results in high levels of nitrite ions and the high loss of nitrogeneous gases to the atmosphere; and (4) it has a low yield of usable nitrogen fertilizer compounds from the initial manufacturing process because the means taught for rationing of ammonia to nitric nitrogen in consonance with the relative alkalinity or acidity of water or soil is by controlling the proportion of ammonia which is oxidized.

In the last case, the effluent gases from the oxidizing catalyst comprise the desired mixture of ammonia-nitric-oxide-oxygen-inert gases, which gas mixture is then cooled and passed into a trickle tower or otherwise brought into contact with the water or a portion of the water to be utilized for irrigation.

This process has the disadvantage of resulting in a large proportion of the ammonia and nitric oxide produced by the process being converted to inert nitrogen gas and water, thus making the process yield so low as to be impractical. The approach was apparently selected because it would interface conveniently with the inherent characteristics of a hydroelectric-irrigation project.

Because the decomposition of ammonium nitrite is an ionic reaction in which the ammonium ion combines with the nitrite ion to form gaseous nitrogen as a product, scrubbers or other sources of turbulence designed to remove nitrogen oxides from gas streams or to form ammonium nitrate and ammonium nitrite using ammoniated liquids suffer substantial raw material losses by decompositions of ammonium nitrite in this manner, especially at higher oxide concentrations because they generally operated at too low pH's.

The multi-purpose irrigation-hydroelectric projects are necessarily large-scale (U.S. Bureau of Reclamation, Reclamation Project Data; historical, technical and statistical information on reclamation projects; U.S. Government Printing Office, 1948) with each project serving as a minimum approximately 20,000 acres and generally substantially more than 50,000 acres of farmland. They are restricted as to general usefulness because they must use large-scale, multi-purpose dam sites for water and power, thereby requiring the consideration of a large number of individual farmer's separate needs in fertilizer management thus making the project unmanageable.

Such projects are useful only for large scale applications and therefore do not permit practical tailoring of the ions produced to specific crop needs unless the same crop is used by many farmers over a wide area in the irrigation district. However, this results in agronomic difficulties with diseases and insects.

Such projects have the disadvantages of: (1) requiring the handling and conversion of nitrogen oxides at a central irrigation-hydroelectric dam site as contrasted to processing in a small locality or on a farm where the control is necessary for agronomic and economic success; (2) causing extensive ground water pollution by requiring the transport of nitrogen fertilizer to farms in district irrigation canals; (3) requiring the transportation of corrosive and environmentally dangerous materials over long distances to farms in open ditches; (4) causing loses of nitrogen fertilizer in delivery to the farm that are economically prohibitive; and (5) having a yield of usable nitrate ions that is low.

This system produces nitrites in the end product in concentrations that would be harmful when applied to crops unless conventional trickle towers, which to be efficient are large in size if operated at atmospheric pressure and require expensive construction and maintenance if operated at conventional high pressure, are used for oxidation to nitrate. Trickle towers normally have 30 to 35 stages for operation at atmospheric pressure. The use of turbine infall or outfall for oxidation conversion results in prohibitive nitrogeneous raw material losses in the form of nitrogen oxide gas loss to the atmosphere.

SUMMARY OF THE INVENTION

Accordingly, it is an object of the invention to provide a novel method for nitrogeneous fertilization of crops.

It is a further object of the invention to provide a novel apparatus for nitrogeneous fertilization of crops.

It is a still further object of the invention to provide an inexpensive method and apparatus for applying substantial amount of nitrogen fertilizers to crops.

It is a still further object of the invention to provide an inexpensive method and apparatus for manufacturing on the farm or local site in agricultural areas, substantial amounts of nitrogen fertilizer solutions in concentration practical for local storage and use.

It is a still further object of the invention to provide a novel fertilizing technique in which the fertilizers are primarily manufactured in the locality where used.

It is a still further object of the invention to provide a novel fertilizing system in which the synthesis of the fertilizer and the application of the fertilizer are done in continuous processes using dilute amounts of materials.

It is a still further object of the invention to provide a fertilizing system which does not require the storage of toxic or explosive gases or materials in substantial amounts or for long periods of time.

It is a still further object of the invention to provide a system for manufacturing and using nitrogen fertilizers in solutions to avoid storage of toxic or explosive gases.

It is a still further object of the invention to provide a manufacturing and fertilizing system for irrigated crops whereby the ratio of ammonium to nitrate ions in the soil solution can be controlled between the values of 50:50 and 0:100 as desired and thereby enhance crop yields.

It is a still further object of the invention to provide a method of manufacturing nitric acid and ammonium nitrate solutions in practical concentrations whereby nitrogen oxide pollution of the atmosphere is eliminated without additional expense in the manufacturing process.

In accordance with the above and further objects of the invention, nitrogen dioxide is prepared from air in an electric arc operation known in the art or prepared from ammonia by passing the ammonia through a catalytic reactor. The ammonia may be purchased at relatively low cost or may be synthesized in a catalytic converter from hydrogen obtained by the electrolysis of water and nitrogen separated from the air, all of which may be done in a continuous process.

On irrigated farms, the nitrogen dioxide is applied through an absorber to water flowing through the irrigation system to form a dilute nitric acid solution on the farm. The nitric acid is either applied as a top dressing or neutralized with a fertilizer cation, the cation amount and type being selected to meet crop requirements. For example, the nitric acid may be mixed with ammonia or potassium compounds to form nitrogeneous fertilizers such as ammonium nitrate or potassium nitrate for application to crops.

For non-irrigated farms and irrigated farms desirous of using concentrated nitrogen fertilizer using conventional application methods, the nitric acid formed in the absorber is circulated to a nitrogen solution storage tank and back to the absorber either continuously or as a batch process. As the solution flows to the absorber, ammonia or another cation is metered into the flowing solution in the preferred embodiment at a rate so as to produce an acid ammonium nitrate solution. A heat exchanger is placed in the process subsequent to neutralization to cool the solution. The circulation process is continued until an ammonium nitrate solution of the desired strength is produced. Where desired, other fertilizer cations can be substituted for ammonia at the neutralization step.

The absorber in the preferred embodiment is a vertical cylindrical column between 5 feet high and 15 feet high, with a diameter of between 9 and 18 inches. It contains trays each of which holds a solid catalyst having surfaces with different attractions to different compounds of nitrogen and oxygen such as an 8 percent nickel stainless steel mesh. To mix the oxides and water, water flows into the top space at a rate of between 1 gallon for each minute and 20 gallons for each minute to provide an output of nitrogen fertilizer liquid. The oxides mixed with bleach air enter the bottom space.

The nitrogen oxides are attached to sites on the catalyst and oxidized to nitrogen dioxide by the air. The nitrogen oxide is only slightly soluble in water and is held to the catalyst by forces sufficiently strong so it is not removed by the water and is oxidized in place to nitrogen dioxide. The nitrogen dioxide reacts with water to form nitric acid and is washed to the bottom of the column. The ratio of nitrogen oxide fixation sites to nitrogen oxide molecules for each unit volume of gas flow through the sections in the upper sections of the column is larger than in the lower sections because oxides are removed by the lower layers.

The system for nitrogeneous fertilization is relatively inexpensive and safe for several reasons, such as: (1) it does not require storage or handling of large amounts of ammonia, nitric acid, nitrogen, hydrogen or the like; (2) it does not require storage of the fertilizer solution itself by a manufacturer prior to shipment to a number of different dealers and farms; (3) it does not require the expensive long-distance transportation of finished fertilizer to dealers and to farms; (4) the use of commercial ammonia can be spread over a crop season instead of requiring use at a peak period while the benefits of using nitrogen solutions with low raw material costs are realized; (5) it requires the dealer or farmer only to buy the relatively inexpensive ammonia or to utilize inexpensive processes in forming nitrogen dioxide or of forming ammonia, which processes and materials are less expensive than the fertilizer itself; (6) it does not require storage of large quantities of fertilizer on the farm prior to use; (7) the fertilizers can be manufactured and supplied in sufficient quantities when needed; (8) heat from exothermic reactions is easily and safely dissipated because of process size and continuity; (9) the synthesis of concentrated nitric acid is not necessary, thus the nitrogen dioxide formation and absorption can be carried out at atmospheric pressure at cost savings over normal commercial processes; and (10) nitrogen oxide pollution is eliminated because absorption is carried out in cool water, at atmospheric pressure and low nitric acid concentrations.

SUMMARY OF THE DRAWINGS

The invention and other features thereof will be better understood from the following detailed description when considered with reference to the accompanying drawings in which.

SPECIFIC DESCRIPTION

Figure 1:
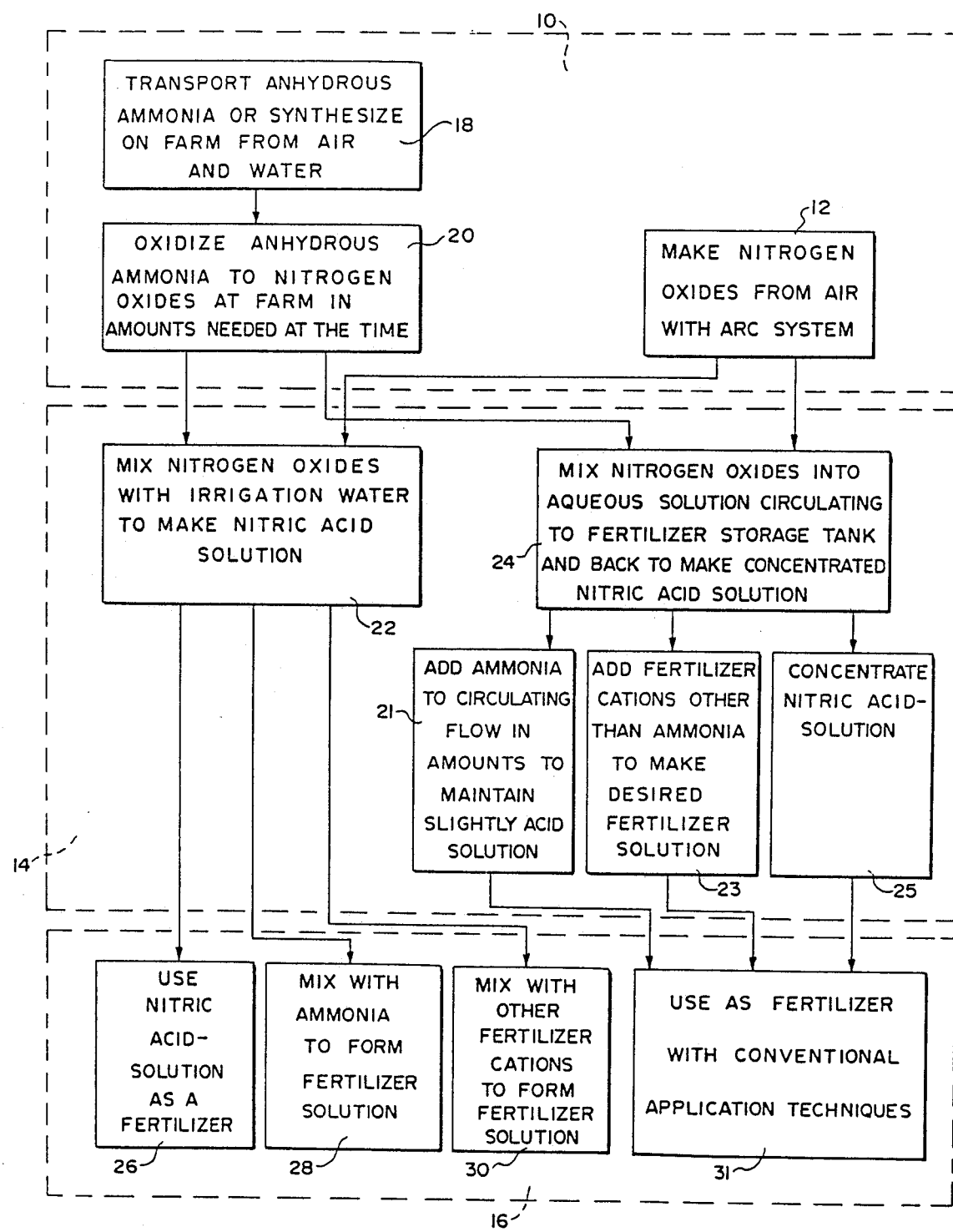
FIG. 1 is a flow diagram of a system for preparing and using nitrogenous fertilizer in accordance with the invention.

In FIG. 1, there is shown a flow diagram of the novel process for nitrogenous fertilizing of agricultural land having two alternate processes 10 for forming nitrogen oxides, two alternate processes 14 for converting the nitrogen oxides into nitrogen compounds susceptible of nitrogen fixation by vegetation and any of several alternate steps 16 for utilizing the nitrogen compounds formed in the process 14.

One series of steps for forming nitrogen monoxide and nitrogen dioxide includes the first step 18 of either transporting anhydrous ammonia to the farm or synthesizing anhydrous ammonia from nitrogen and hydrogen on the farm. Either of the steps are accomplished as the fertilizer is needed so that it is not necessary to store large amounts of anhydrous ammonia.

The second step 20 in forming the nitrogen oxides is to oxidize the anhydrous ammonia on the farm into nitrogen oxides in a continuous process in the amounts needed at that time for forming the fertilizer. The oxidation takes place at atmospheric pressure and substantially concomitantly with downstream fertilizer solution formation and application to the farmland. Consequently, it is not necessary to handle the nitrogen oxides under pressure or store the nitrogen solutions in large quantities. A process suitable for such oxidation is disclosed in U.S. Pat. No. 3,660,024.

The alternate step 12 for forming the nitrogen oxides includes the preparation of nitrogen monoxide from air using an electric arc in a process well known in the art and the synthesis of nitrogen dioxide from the nitrogen monoxide prepared in the first step together with oxygen which may be from the air or from another source of pure oxygen in an electric arc.

The nitrogen oxides formed by either of the series of steps indicated at 10 are then utilized in one of the alternate processes 14 to prepare a nitric-acid/nitrous acid solution which continually flows and is either applied as fertilizer itself, or formed into other nitrogenous fertilizers. The nitric-acid/nitrous acid solution is prepared by combining the nitrogen oxides with water in an absorber such as in a spray system, a bubbling system or a packed column into which the nitrogen oxides are injected. At no time is it necessary to handle concentrated nitric acid or to store large amounts of nitric acid in this process. Although the solution is primarily nitric acid and nitrous acid, it will hereinafter be referred to as a nitric acid solution.

One of the processes includes the step 22 of mixing the nitrogen oxides with water to obtain a dilute nitric acid. The alternate process includes the steps 24 of mixing nitrogen oxides into an aqueous solution and circulating the solution to a fertilizer storage tank and back to increase its concentration and to form a salt solution which is less corrosive. Other processing steps are employed such as: (1) the step 21 of adding to the circulating flow in amounts to maintain a acid solution; (2) the step 23 of adding fertilizer cations other than ammonia to make a desired fertilizer solution; or in some instances, (3) the step 25 of concentrating the acid solution.

The solution from the step 14 may be used in any of several steps 16 such as those indicated at 26, 28 or 30 and the solutions formed by steps 21, 23 or 25 may be applied with conventional fertilizer application techniques as indicated at 31 to fertilize the farmlands.

Firstly, the dilute nitric acid may be applied directly to the farmland as a top dressing with the irrigation water, for example, at certain stages of growth of certain crops with beneficial effects as shown at step 26. Secondly, the nitric acid may be mixed within the irrigation water with ammonia to form ammonium nitrate which is applied to the farmland as shown in step 28. This step is preferred for crops which utilize ammonium and nitrate ions equally as it only requires sending one half of the ammonia nitrogen through the oxidizer. Thirdly, a cation such as potassium may be mixed with the nitric acid to form fertilizers which are especially useful for certain crops.

The process illustrated in FIG. 1 is economical and safe for several reasons, such as: (1) it does not require storage of large amounts of gases, ammonia, nitric acid, nitrogen or the like; (2) it does not require storage of the fertilizer solution itself by a manufacturer prior to shipment to a number of different farms; (3) it does not require the expensive transportation of a finished fertilizer solution to farms; (4) it requires the farmer only to buy the relatively inexpensive ammonia or to utilize inexpensive processes forming nitrogen dioxide or of forming ammonia, which processes and materials are less expensive, than the fertilizer itself; (5) it does not require storage of large quantities of fertilizer on the farm prior to use; (6) heat from exothermic reactions is easily and safely dissipated because the processes are small and continuous; and (7) the fertilizers can be manufactured and supplied in sufficient quantities when needed.

Figures 2, 3:
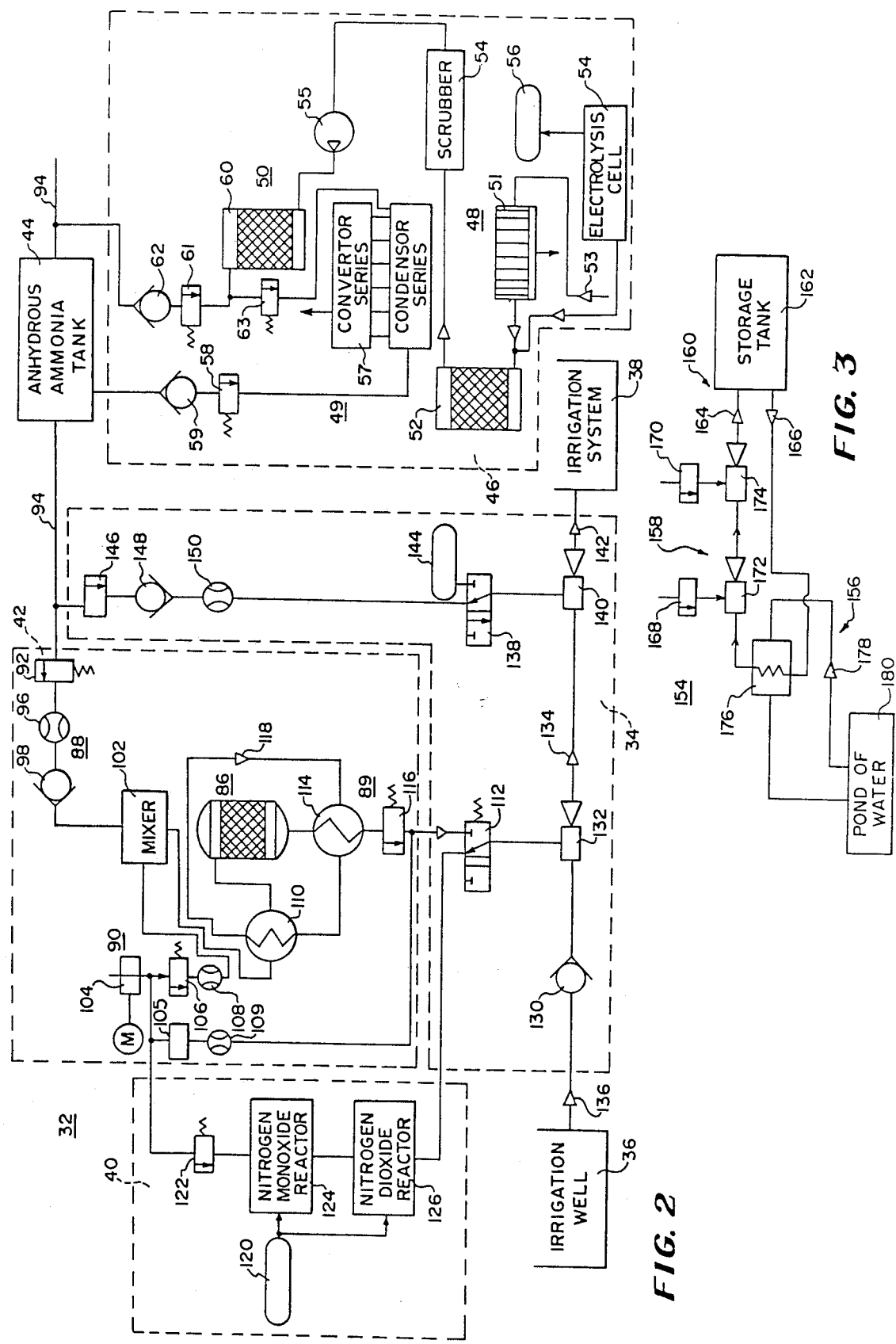
FIG. 2 is a graphic drawing of a portion of the system of FIG. 1.
FIG. 3 is a graphic drawing of another portion of the system of FIG. 1.

In FIG. 2, there is shown a system of nitrogenous fertilization 32 having a system 34 for preparing nitrogeneous fertilizer, an irrigation well 36 and an irrigation system 38, with the inlet to the system 34 being connected to the outlet of the irrigation well 36 to receive water therefrom and the outlet of the system 34 being connected to the irrigation system 38 to apply the nitrogenous fertilizer through the irrigation system to the vegetation. Connected to the system 34 is a first system 40 and a second system 42 for preparing nitrogen oxides, with the system 42 being connected to an anhydrous ammonia tank 44, which communications with a system 46 for preparing anhydrous ammonia.

In operation, the systems 40 and 42 prepare and supply nitrogen dioxide to the system 34 which prepares nitrogenous fertilizer and supplies the nitrogeneous fertilizer to the irrigation system 38 with water from the irrigation well 36 in a continuous process. This continuous process avoids the necessity for storing large quantities of gases, ammonia, nitrogen, nitrogen dioxide or fertilizer or for transporting over long distances large amounts of fertilizer solutions thus reducing the cost of and facilitating nitrogenous fertilization and increasing its safety and availability. The nitrogen oxides are formed from air in the system 40 and from anhydrous ammonia in the system 42.

In the preferred embodiment, the nitrogen oxides are formed from anhydrous ammonia which is stored in the tank 44. The anhydrous ammonia is relatively inexpensive and may be purchased and shipped to the farm for processing and subsequent use or storage as a non-pressure solution after processing. In the alternative, it may be prepared directly on the farm.

To prepare anhydrous ammonia on the farm, the system for preparing ammonia 46 includes a hydrogen-nitrogen-combination forming system 48, an anhydrous ammonia supply system 49 for on-line ammonia supply or ammonia accumulation.

To prepare a suitable hydrogen-nitrogen combination, the hydrogen-nitrogen-combination forming system 48 includes an electrolysis cell 54, a filter 51, an oxygen burner 52, an air blower 53, an ethanolamine carbon dioxide scrubber 47, a compressor 55 and an oxygen storage tank 56.

A gas synthesizing system and in this case an electrolysis cell 54 which is a type known in the art and from the electrolysis of water provides oxygen to the tank 56 and hydrogen to the gas stream to the burner 52 with hydrogen being mixed with gases which are fed by the blower 53 to the burner 52.

To provide the desired nitrogen-hydrogen mixture, hydrogen in excess of that needed to burn oxygen from the air is mixed with the air feed to the oxygen burner 52 in the proper ratios. The outlet from the burner 52 is connected to the compressor 55 through the scrubber 47 which removes impurities.

The mixture of gases may be either converted to liquified anhydrous ammonia for storage in the tank 44 or the ammonia continuously passed through the tank and used in making solutions. In the alternative, it may be passed directly to the line 94 through the valves 61 and 62. In the latter approach, measures must be taken to prevent waste of feed gases that are contained in the exit gases.

To supply anhydrous ammonia to the tank 44, the anhydrous ammonia supply system 49 includes a converter and condenser series 57, a valve 58 and a check valve 59 communicating in series in the order named between the outlet of the condenser series and the inlet of the anhydrous ammonia tank 44. A converter and condenser series are described in "Encyclopedia of Chemical Technology," ed. Kirk-Othmer, 1963, V. 2, Interscience Publisher, pages 259-289. A recirculating process is described in "Chemical Technology, Encyclopedia Treatment" by Van Toor, 1968, V. 1, Barnes and Nobel, which may be adapted for use in the ammonia supply system in a manner known in the art. While operating, the converter and condenser series 57 provide ammonia to the anhydrous ammonia tank 44 through the valves 58 and 59. The first converter stage 60 of the converter series 57 is shown separately for convenience in explanation.

To provide gaseous ammonia to the conduit 94, the on-line gaseous ammonia supply system 50 includes the converter 60, a valve 61 and a check valve 62, communicating in series between the outlet of the compressor 55 and the conduit 94 in the order named. A second two-port valve 63 connects the first converter stage 60 to the first condenser stage and cooperates with the valve 61 to select and control the flow of ammonia through the two paths, one of which is to the line 94 and the other of which is to the ammonia tank 44.

To prepare nitrogen oxides from ammonia, the system 42 includes a reactor 86, a system 88 for supplying anhydrous ammonia to the reactor 86, a system 90 for supplying air to the reactor 86 and bleach air to the reactor exit gases and a system 89 for supplying nitrogen oxides and waste gases to the system 34 for preparing fertilizer from nitrogen oxides. The nitrogen oxides contain substantial amounts of nitrogen monoxide.

To apply controlled amounts of anhydrous ammonia to the mixer 102, a two-port, infinitely-variable, normally-closed valve 92 has its inlet port connected to the anhydrous ammonia tank 44 through a conduit 94 and its outlet connected to an inlet of the mixer 102 through a flow meter 96 and a check valve 98.

To apply air to the mixer 102, the system 90 includes an air blower 104 which communicates with the mixer 102 through a two-port, infinitely-variable, two-stage regulator valve 106 and a flow meter 108.

To apply bleach air to the reactor 86 exit gases, the system 90 includes an air blower 104 which communicates with the exit gas conduit through a two-stage regulator valve 105 and a flow meter 109.

To preheat the gas mixture for application to the reactor 86, the mixture is flowed through a heat exchanger 110. To permit nitrogen oxides to flow from the reactor 86 into the system 34 for preparing fertilizer solutions, the outlet of the reactor 86 in connected to one of the inlets of the three-position, three-port valve 112 in the system 34 through a heat exchanger 114, a two-port, infinitely-variable, normally-closed, two-stage regulator valve 116 in series.

The reactor 86 includes a catalyst such as platinum which causes ammonia to be converted to nitrogen oxides when heated in the presence of air. To heat the ammonia and the air, the pump 118 pumps air through the heat exchanger 114 which cools the gases from the reactor 86. This air is passed through the heat exchanger 110 where it heats the air-ammonia mixture. The reactor 86 exit gas it hot because the reaction forming nitrogen oxides are exothermic.

To convert air to nitrogen dioxide, the system 40 includes a two-port, infinitely-variable, normally-closed valve 122, a nitrogen monoxide reactor 124 and a nitrogen dioxide reactor 126. The inlet of the valve 122 is connected to the outlet of the air supply 104 to receive air, which it applies to one inlet of the nitrogen monoxide reactor 124.

The nitrogen monoxide reactor 124 applies an electric arc to the materials entering it to create nitrogen monoxide from nitrogen and oxygen in the air. The nitrogen monoxide passes into the nitrogen dioxide reactor 126 which cools the nitrogen monoxide and receives oxygen from the air blower 104 or oxygen from the tank 120 to form nitrogen dioxide which passes to another inlet of the valve 112 in the system 34.

To prepare dilute nitric acid, the system 34 includes the valve 112, a check valve 130 and an absorber 132. At least some of the water flowing from the irrigation well 36 to the irrigation system 38 is pumped by an irrigation pump 136 through the check valve 130 into the absorber 132 where the nitrogen dioxide from the valve 112 is injected under the water. Dilute nitric acid is formed and is available to the outlet of the absorber 132. This nitric acid may be pumped directly into the irrigation system 38 to be used as top dressing to fertilize certain crops. In the alternative, it may be combined with ammonia or other cations such as potassium compounds to form ammonium nitrate, potassium nitrate or other nitrogeneous compounds to be pumped into the irrigation system as fertilizer.

The form of nitrogen in the fertilizer solution can be tailored to fit a specific crop's needs at this juncture. For example, if it is desired to have a 50:50 ammonium:- nitrate ion ratio, neutralization is carried out with ammonia. If only nitrate is desired, neturalization need not be carried out. Ratios of ammonium:nitrate other than above may be obtained simply by regulating the amount of ammonia used.

Less than a stoichiometric ratio of ammonium:nitrate ions may be obtained by adding a proportion of the stoiciometric amount of the ammonium ion equal to the desired ratio thus resulting in an acid solution.

Greater than a stoichiometric ratio of ammonium:nitrate ions may be obtained by adding a proportion of the stoichiometric amount of the ammonium ion equal to the desired ratio, thus resulting in a basic solution. Excess ammonia can be added to the point where the vapor pressure of the solution does not result in significant losses of ammonia nitrogen to the atmosphere or to the point where the deposits of calcium carbonate become excessive. Should it be desired to have a neutralized solution containing only nitrate nitrogen, a non-nitrogeneous cation such as potassium can be used at the neutralization step.

To prepare, for example, ammonium nitrate or potassium nitrate, the system 34 includes a three-way, three-port valve 138, a neutralizer 140, which is a jet mixer, and a pump 134. The three-way valve 138 either connects a source of ammonia or, for example, a potassium compound to the neutralizer 140, the other inlet of the neutralizer 140 being connected to the outlet of the absorber 132 to receive the dilute nitric acid solution. The nitric acid reacts with ammonia to form ammonium nitrate or with the potassium compound to form potassium nitrate which is pumped by the pump 142 into the irrigation system 38 to be used as fertilizer. The neutralizer 140 may bubble the ammonia or potassium compound through the fluid from the absorber 132 or may use a spray system in which the nitric acid solution from the absorber 132 is sprayed over a potassium compound or ammonia diffuser.

To provide a potassium compound to the neutralizer 140, the system 34 includes a tank 144 connected to one inlet of the valve 138 for application of a solution of the potassium compound under pressure to the neutralizer 140. To provide ammonia to the neutralizer 140, the other inlet of the valve 138 is connected to the conduit 94 from the anhydrous ammonia tank 44 through a two-port, infinitely-variable, normally-closed valve 146, a check valve 148 and a flow meter 150 in series in the order named to meter the anhydrous ammonia into the neutralizer 140 where it may react with the dilute solution of nitric acid to form ammonium nitrate for application to the irrigation system.

Generally, this system of manufacturing and applying fertilizer is suitable for use in oxidizing between 300 and 3500 pounds of nitrogen each day and is of greater economic value when it is desired to oxidize from 700 to 1200 pounds of nitrogen each day, Thus, it is intended to oxidize between 12.5 and 146 pounds of nitrogen each hour and works best in the range of 30 to 50 pounds each hour. It can be scaled down for experimentation. It is of such a size normally as to prepare an amount of nitrogen fertilizer that will provide between 30 to 50 pounds of fertilizer in each acre-inch of irrigation water applied to a single field in the irrigation connected embodiment. The solution when transferred on a continuous flow basis to an irrigation system is normally less than 5 percent nitrogen. It can use between 1 gallon and 20 gallons per minute of process water. When a preponderance of nitrate is fed to a crop with this system, the nitrogen concentration of chemical process water will normally be about 2 percent although wide variations in fertilizer nitrogen strength can be achieved if desired.

In FIG. 3, there is shown a system 154 for concentrating and storing fertilizer in solution on the farm or in the vicinity of several farms such as at a rural fertilizer dealer's premises having a cooling system 156, a neutralizing system 158 and a circulating storage system 160. The circulating storage system 160 includes a storage tank 162 having first and second ports for receiving fluid and for permitting the exit of fluid so that fluid continually circulates through the tank being pumped by any of several pumps such as 164 and 166.

The neutralizing system 158 includes first and second two-port, continuously-variable valves 168 and 170, an absorber 174, a neutralizer 172 and a heat exchanger 176. The first valve 170 controls the flow of nitrogen oxides into one port of the absorber 174, the other port accommodates the flow of fluid circulating through the storage tank 162 under pressure form the pump 164 so that the nitrogen oxides produced from the systems shown in FIG. 2 may be absorbed into the fluids circulating through the storage tank 162. The two-port, continuously-variable valve 168 controls application of ammonium or other fertilizer cations into one port of the neutralizer 172, the other neutralizer port acommodates the flow of the fluid circulating through the storage tank 162.

The heat exchanger 176 removes heat generated from neutralization of nitric acid with ammonia. It includes for this purpose a pump 178 which circulates water from a pond of water 180 on the farm through the heat exchanger 176 to cool the fluid circulating through the storage tank 162.

This arrangement may be used to form concentrated nitrogen solutions for immediate use or storage on the farm. By concentrating the solutions, they may be applied efficiently through conventional application techniques and the preparation of the nitrogen oxides may be continued on a farm scale throughout the year and nevertheless result in concentrated nitrogen fertilization solutions at the proper time for application to the farmland in an economical manner.

By regulating the nature or amount of the cation introduced to the neutralizer 172 or by simply foregoing the neutralization step, this arrangement may be used to control the ratio of nitrate to ammonium ions in the nitrogen solutions, as explained above. Process feedwater rates are adjusted in this embodiment to provide a non-pressure nitrogen solution containing from approximately 6 percent to 21 percent nitrogen. The concentration obtained depends on the planned use of the product and operating flows are adjusted in accordance with the user's product desires.

Figure 4:
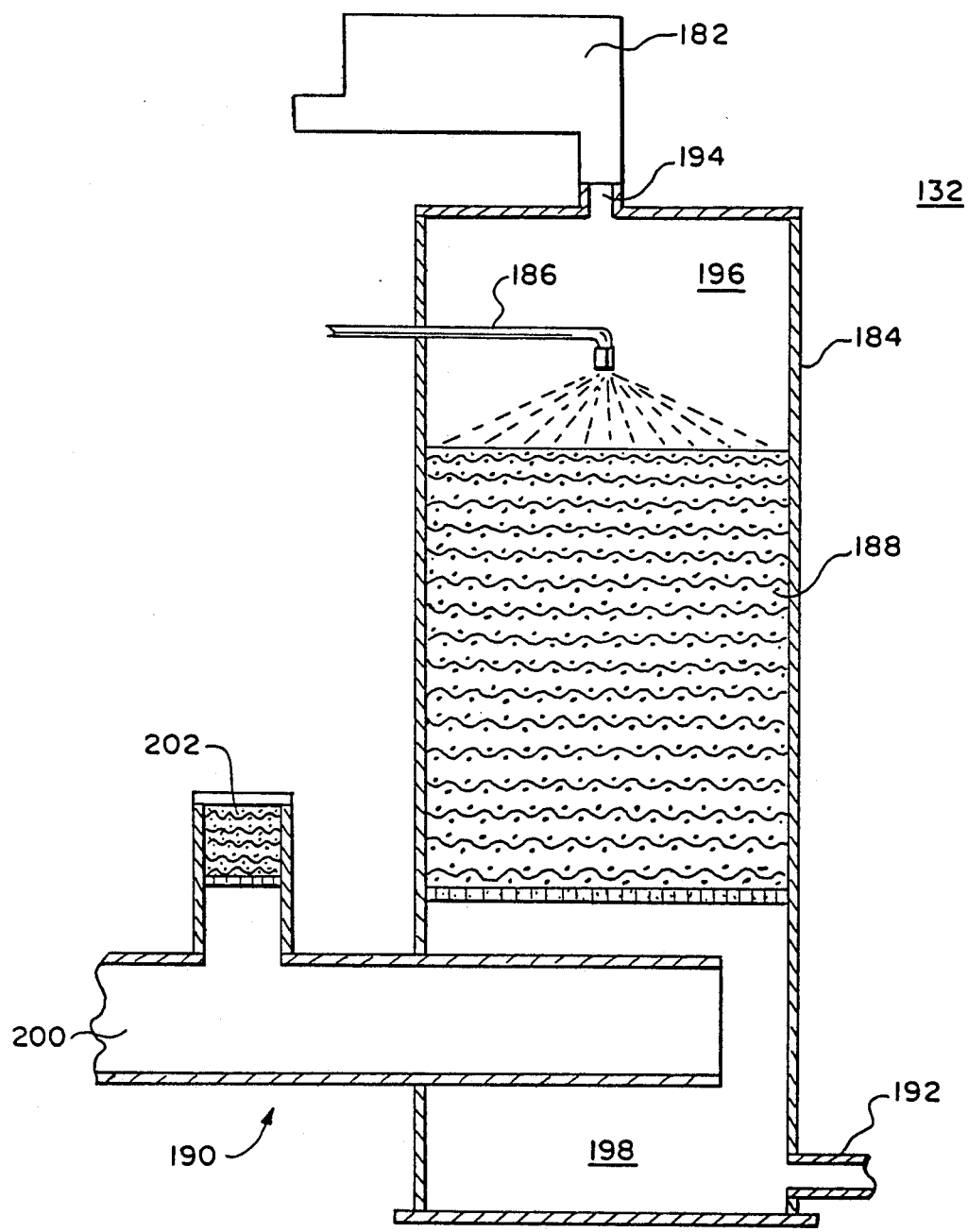
FIG. 4 is a simplified sectional view of a portion of the embodiment of FIGS. 1-3.

In FIG. 4, there is shown a simplified sectional view of the absorber 132 having a blower 182, an absorber column 184, a water distributor 186, surface catalyst packing 188, a gas inlet 190 and a nitric acid outlet 192.

The absorber column 184 has the blower 182 connected to its top to pull gases through a filter 194 and to exert a suction pressure on the system in cooperation with the pump 134 (FIG. 2). Below the filter 194, the column communicates with the water distributor 186 which applies water to the catalyst packing 188 in the center of the column. Below the catalyst packing 188 is the gas inlet 190 and at the bottom, the nitric acid outlet 192 for liquid nitric acid. The absorber column 184 is a hollow, vertical, cylindrical column between 5 feet high and 15 feet high with a diameter of between 9 inches and 18 inches. It is filled except for a space at the top and a space at the bottom, with a solid catalyst packing 188 having surfaces with different attractions to different compounds of nitrogen and oxygen such as an 8 percent nickel stainless steel mesh.

To mix the oxides and water, water flows into the top space from water distributor 186 which is connected to valve 130 (FIG. 2) at a range of rates of between 1 gallon for each minute and 20 gallons for each minute to provide an output of nitrogen fertilizer liquid. The oxides mixed with bleach air enter the bottom space 198.

The nitrogen oxides are attached to sites on the catalyst and oxidized to nitrogen dioxide by the air. The nitric oxide is held to the catalyst by forces sufficiently strong so it is not removed by the water and is oxidized in place to nitrogen dioxide. The nitrogen dioxide reacts with water to form nitric acid and is washed to the bottom of the column. A suitable catalyst is described in connection with a tail gas scrubber in U.S. Pat. No. 4,019,870 to Gilbert granted Apr. 26, 1977.

The gas inlet 190 receives nitrogen oxides at 200 which communicates with the valve 112 (FIG. 2) and air through the filter 202 which is adjusted to provide a molar ratio of oxygen to nitric oxides entering at 200 of at least 2 to 1 and probably will be adjusted, in most cases, in the preferred embodiment, to 5 to 1. The ratio will change depending on: (1) the geometry and size of the column; (2) the geometry, type of packing and amount of packing; and (3) the points of entry of air or other oxidant.

Figure 5:
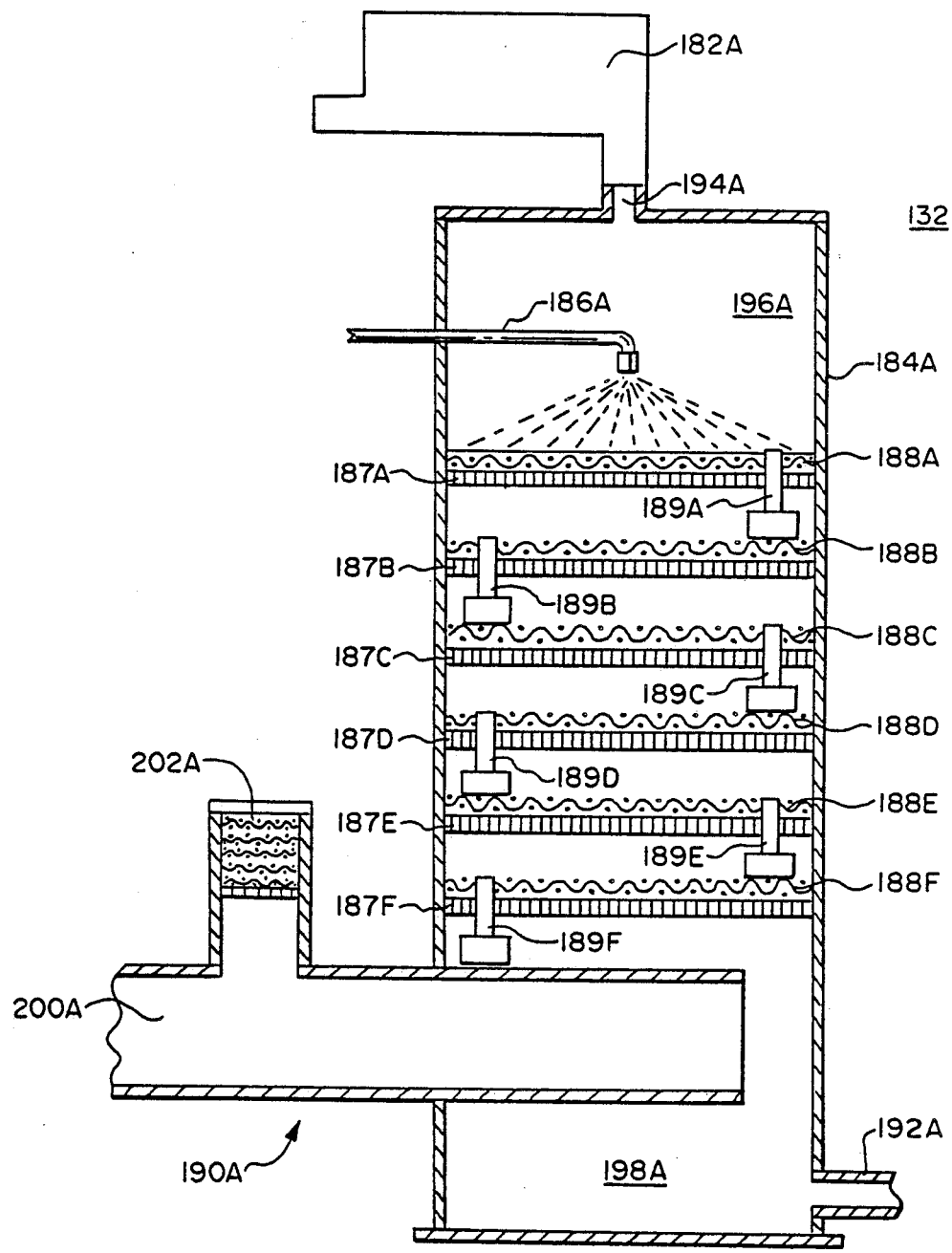
FIG. 5 is a simplified sectional view of another embodiment of the portion of FIG. 4.

In FIG. 5, there is shown a simplified sectional view of another embodiment of absorber 132 having a blower 182A, an absorber column 184A, a water distributor 186A, surface catalyst packing 188A-188F, a gas inlet 190A and a nitric acid outlet 192A.

The absorber column 184A has the blower 182A connected to its top to pull gases through a filter 194A and to exert a suction pressure on the system in cooperation with the pump 134A (FIG. 2) in the same manner as the embodiment of FIG. 4. Instead of a substantially continuous section of packing 188 (FIG. 4), the embodiment of FIG. 5 includes a plurality of sieve trays 187A-187F, a plurality of layers of mesh packing 188A-188F and a plurality of downcomers 189A-189F, forming together a packing section.

Sieve trays are used to provide a control means for obtaining an optimum relationship between column pressure, residence, time of the liquid with catalytic sites and probability of contact of nitrogen oxide with a catalyst. The sieve trays 187A-187F, which are constructed with cooling coils attached or as part of them, are vertically spaced within the column 184 and each supports upon it a corresponding one of the layers of packing 188A-188F and has passing through it a corresponding one of the downcomers 189A-189F. The combinations of sieve trays and packing are spaced from each other and the sieve trays are perforated to permit gas to pass upward through them and the packing and water to flow downwardly, with are spaces between.

The packing in each layer is sufficiently thick and dense to fix substantial portions of the oxides but not so thick as to prevent turbulence by impeding water flow. The ratio of nitrogen oxide fixation sites to nitrogen oxide molecules for each unit volume of gas flow through the sections in the upper sections is larger than in the lower sections because oxides are removes by the lower layers. In the preferred embodiment, the layers are approximately 4 inches thick. While 6 layers are shown as an illustration, more or less may be used as required.

To provide a control means for column pressure and liquid volume held by the trays, the downcomers 89A-89F are tubes having an open top even with the top of its corresponding layer of packing and an open bottom passing through its corresponding one of the nine trays 187A-187F to form a passageway for water which, when it exceeds the top of the mesh and forms a pressure head of the optimum amount for the counter flowing gas, liquid flows into it and downwardly to the next lower tray.

Below the filter 194A, the column communicates with the water distributor 186A which applies water to the catalyst packing 188A in the center of the column through which it flows to pass in succession through packing 188B-188F. Below the catalyst packing 188A-188F is the gas inlet 190A and at the bottom, the nitric acid outlet 192A for liquid nitric acid. The catalyst and operation is substantially the same as in the embodiment of FIG. 4. The amount of mesh is related to the number of catalyst sites available and the volume of liquid which is held by the sum of the trays is related to the residence time with appropriate selection of all packing trays or trays combined with packing and with the proper design in the case of the packing trays and downcomers, the concentration of nitric acid can be increased or decreased with manipulation of liquid flow rates.

Figure 6:
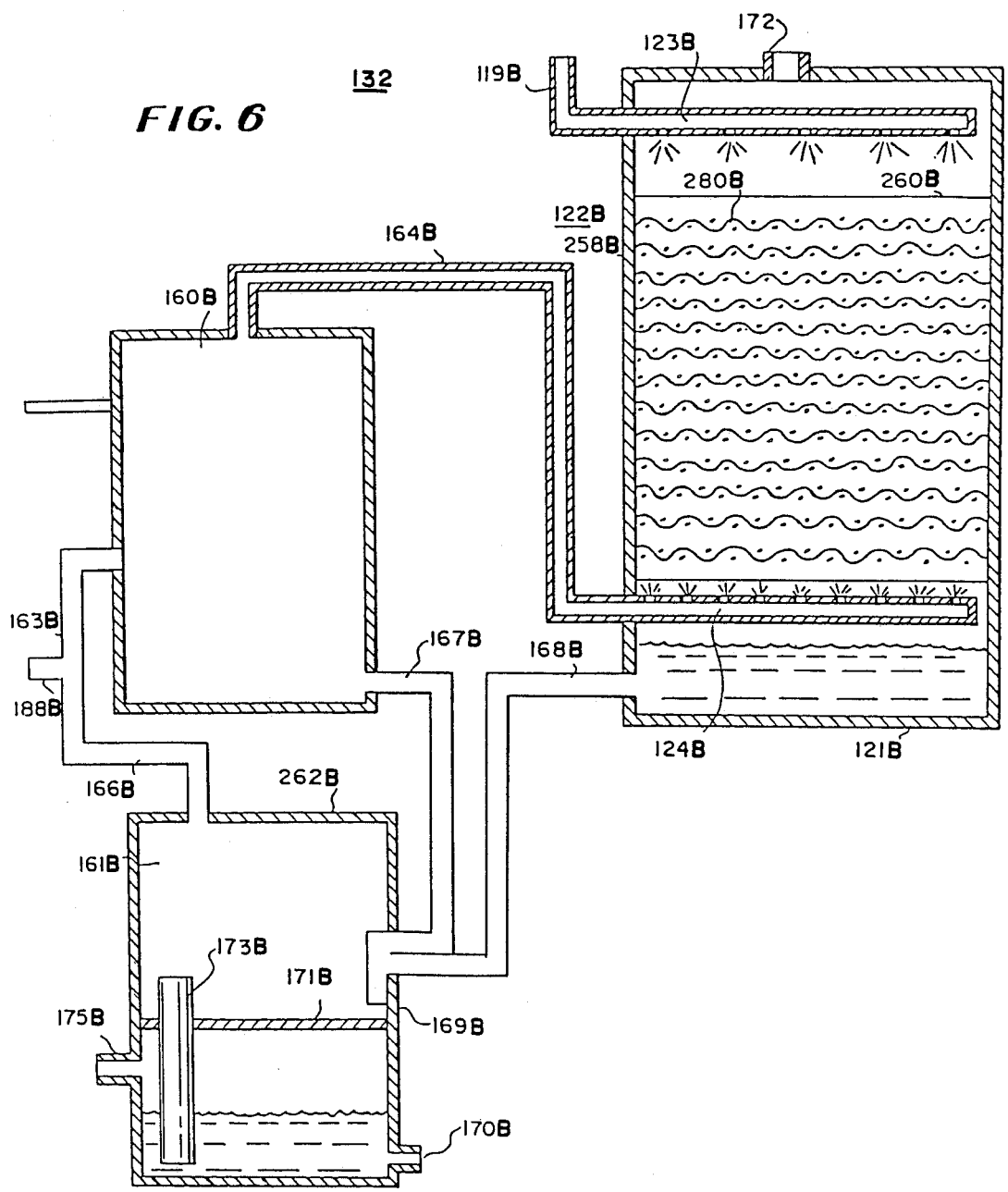
FIG. 6 is a simplified sectional view of still another embodiment of the portion of FIG. 4.

In FIG. 6, there is shown still another embodiment of absorber 132 which includes with either of the embodiments of FIGS. 4 or 5 (indicates a gas-liquid contacting tank 160B herein) two other elements, which are a second stage absorber 122B and stripper-oxidizer 262B, described more completely in U.S. Pat. No. 4,427,434 to Eastin, issued Jan. 24, 1984, the disclosure of which is incorporated herein.

Beneath the sieve tray 187F (FIG. 5) and the lowest compartment, conduit 166B communicates with the interior of the gas-liquid contacting section column 160B to apply nitrogen oxide gases to this compartment from conduit 188B which are separated from the liquid at that point. The liquid flows to the stripper-oxidizer tank 161B through conduit 166B. The gases applied to the gas-liquid contacting column 160B flow upwardly through the sieve trays where they are contacted with water and result in nitric acid flowing down to the bottom of the gas-liquid contacting column 160B. Gases which are not absorbed pass through the conduit 164B into the second stage absorber tank 121B. Nitric acid from the bottom of the tank communicates with the inlet to conduit 167B which leads to a lower gravitational level into the stripper-oxidizer tank 161B.

The second stage absorber tank 121B includes a stainless steel wall 258B forming a compartment, having three horizontally spaced sections, which are: (1) a packing material section 260B; (2) a lower distributor section having a lower distributor pipe 124B; and (3) an upper distributor section having an upper distribution pipe 123B.

The packing material section 260 B is in a central portion of the stripper tank 121B and above it is an upper distributor 123B connected to conduit 119B through which ammonium hydroxide is distributed on the packing material 280B beneath it and beneath the packing material section 260B is a lower distributor pipe 124B which communicates with the conduit 164B to admit nitrogen oxide gases which flow upwardly through the packing material section 260B to contact the ammonium hydroxide.

The distributor 123B is a continuation of the pipe 116B having spaced along it length a plurality of spaced apart openings through which the ammonium hydroxide flows. Similarly, the distributor 124B is a continuation of the conduit 164B containing along its upper and lower surface a plurality of spaced apart apertures which distribute the nitrogen oxides. Through the top of the compartment of tank 121B is an opening which communicates through a pipe 172 with a filter 128B to remove the entrained particulate materials.

Beneath the distributor 124B, the conduit 168B communicates with the interior of the tank 121B to enable the ammonium nitrite-nitrate solution to flow downwardly into the stripper-oxidizer tank 161B. The ammonium nitrite and the ammonium nitrate are formed by the gases flowing upwardly and contacting the ammonium hydroxide on the surfaces of the packing material section 260B.

The stripper-oxidizer section tank 161B includes stainless steel walls 262B, a stripper-oxidizer plate 171B and a downcomer 173B. The conduit 166B passes between the gas-liquid contacting section tank 160B and the top of the walls of the stripper-oxidizer tank 161B to permit flow of nitrogen oxides therethrough.

The stripper-oxidizer plate 171B separates the interior of the stripper-oxidizer tank 161B into two compartments, with the conduit 175B and the conduit 170B entering the first compartment and the conduit 166B entering the top compartment so that the nitric acid and ammonium nitrite-nitrate solutions enter and mix in cup 169B and then flow across the stripper-oxidizer plate 171B to the top of the downcomer 173B which passes through the stripper-oxidizer plate 171B causing the acidic ammonium nitrate solution to flow into the bottom compartment where it may exit through conduit 170B. Heated air passing through conduit 175B causes turbulence in the top compartment of the stripper-oxidizer plate 171B so that the ammonium nitrite-nitrate and nitric acid flowing through conduits 167B and 168B to the junction at 169B where they are mixed are further exposed to oxygen and turbulence to cause rapid mixing of the ammonium nitrate and ammonium nitrite with nitric acid causing an immediate lowering of the pH of the ammonium nitrite-nitrate solution before decomposition can take place and quick oxidation of the ammonium nitrite to ammonium nitrate with the evolution of nitrogen oxides.

Substantially all of the nitrogen dioxide in the gas mixture is absorbed and reacted with the water in the gas-liquid contacting section tank 160B to form nitric acid and nitric oxide. The gases not absorbed, as well as the nitrogen oxide formed in this stage, are passed on to the second stage absorber 122B. It is generally accepted in the art that nitric acid formed in this manner results from many intermediate reactions and there is wide disagreement as to the specific steps that are involved in the reaction but there is agreement that the overall stoichiometry resulting from the various proposed reactions is substantially that of three molecules of nitrogen dioxide an one molecule of water yielding two molecules of nitric acid and one molecule of nitric oxide.

The nitrogen oxides exiting the gas-liquid contacting section tank 160B are comprised principally of nitric oxide. Recovery of the nitrogen oxides is done without the use of high pressure and in only one further absorption stage utilizing a different chemical process than the first stage.

The second absorption stage 122B is arranged to communicate with the first absorption stage and: (1) effectively use the product of the first absorption stage to further oxidize the products of the second absorption stage to make an ammonium nitrate solution directly; and (2) efficiently recirculate the nitrogen oxides formed in the process through the gas-liquid contacting apparatus 160B to facilitate nitric acid formation from the exit gases of the ammonium nitrite oxidation process in the stripper-oxidizer 161B.

Specifically, the inert gases and nitrogen oxides, which are principally nitrogen oxide, that exit the gas-liquid contacting section tank 160B pass through a conduit 164B and distributor 124B to the second stage packed absorber 122B. The reaction liquid fed to absorber tank 121B to wet the packing is ammoniated water and is fed through a distributor 123B. The ammonia rate is regulated to keep the pH of the liquid in absorber tank 121B above pH 6.7 and preferably between pH 8.0 and pH 8.4.

The packing of absorber tank 121B can be of a variety of materials commonly known in the art to be efficient in gas-liquid contacting. In the preferred embodiment, 1½-inch plastic rings sold under the trademark, Koch Flexrings, have been found to be effective.

The oxides react rapidly in both the liquid and gas phases continuously to form an ammonium nitrite-nitrate solution, which is collected in the bottom of absorber tank 121B. The high pH solution collected in the bottom of absorber tank 121B is transferred through conduit 168B to the mixing chamber 169B of the stripper-oxidizer 161B. There it is combined with the flow from conduit 167B, which is primarily nitric acid that is produced in the gas-liquid contacting tank 160B. The two liquids are mixed rapidly in the mixing chamber and then flow from the mixing chamber across the stripper-oxidizer plate 171B and the resultant acidic ammonium nitrate product is transferred through a downcomer 173B to the bottom, or liquid collection zone, of the stripper-oxidizer 161B. The acidic ammonium nitrate solution is available for direct use as a fertilizer or for further processing to make another desired fertilizer product.

As can be understood form the above description, the system 32 for supplying nitrogenous fertilizer solutions to a field is inexpensive, safe and designed to interact efficiently with specific nutritional requirements of crops for several reasons, such as (1) it does not require storage of large amounts of gases, ammonia, nitric acid, nitrogen or the like; (2) it does not require storage of fertilizer solution itself by a manufacturer prior to shipment to a number of different farms; (3) it does not require the expensive transportation of finished fertilizer to farms; (4) it requires the farmer only to buy the relatively inexpensive ammonia or to utilize inexpensive processes of forming nitrogen dioxide or of forming ammonia, which processes and materials are less expensive than the fertilizer itself; (5) it does not require storage of large quantities of fertilizer on the farm prior to use; (6) heat from exothermic reactions is easily and safely dissipated because the processes are small and continuous; (7) the fertilizers can be manufactured and supplied in sufficient quantities when needed; and (8) the ratio of nitrate to ammonium ions in the solution can be controlled to fit the needs of specific crops.

Although a preferred embodiment of the invention has been described with some particularity, many modifications and variations in the invention are possible in the light of the above teachings. It is therefore to be understood that, within the scope of the appended claims, the invention may be practiced other than as specifically described.

What is claimed is:

1. Apparatus for nitrogeneous fertilizing comprising:
   an anhydrous ammonia tank containing ammonia;
   mixer means for mixing air and ammonia;
   burner means for oxidizing between 12.5 pounds and 146 pounds of nitrogen each hour in a continuous process by burning ammonia;
   ammonia conduit means connecting said anhydrous ammonia tank containing ammonia and said mixer means;
   ammonia valve means within said ammonia conduit means for restricting the flow of anhydrous ammonia between said anhydrous ammonia tank and said mixer means to a range of between 12.5 pounds and 146 pounds of nitrogen each hour;
   mixer gas conduit means connecting said mixer means and said burner means for supplying a mixture of anhydrous ammonia and air to said burner means;
   said burner means including a catalyst capable of sustaining burning of ammonia and air after ignition;
   first-stage absorber means containing a first packing;
   said first packing including a solid surface catalyst for aiding reactions between ammonia oxides and air;
   means for supplying water to said first-stage absorber means;
   first oxide conduit means communicating with said burner means and said first-stage absorber means for permitting the flow of the products of combustion from said burner means to said first-stage absorber means;
   means for bringing the nitrogen oxides formed by burning the ammonia into contact with the solid surface catalyst and flowing water int eh first-stage absorber means in a continuous process as the nitrogen oxides are formed to form a dilute solution of nitric acid in a continuous stream;
   filter inlet means for permitting air to enter said first-stage absorber means at a rate to provide a molar ratio of oxygen to nitric oxides of at least 2 to 1;
   second-stage absorber means adapted to hold a second packing material;
   means communicating with said first-stage absorber means and said second-stage absorber means for moving nitrogen oxides from said first-stage absorber means to said second-stage absorber means;
   conduit means for applying ammonium hydroxide to the second-stage absorber means whereby ammonium nitrite and ammonium nitrate solutions are formed;
   said conduit means including regulating means for restricting the flow of said ammonium hydroxide to a level that maintains the pH in an absorber tank above 6.7;
   stripper-oxidizer means communicating with said first-stage absorber means and second-stage absorber means for receiving said dilute solution of nitric acid and from said first-stage absorber means and ammonium nitrite from said second-stage absorber means; whereby said ammonium nitrite is oxidized to ammonium nitrate; and
   outlet means from said stripper-oxidizer means whereby nitrate fertilizer solution may be removed therefrom.

2. Apparatus according to claim 1 in which the solid surface catalyst includes a nickel alloy mesh.

3. Apparatus according to claim 2 in which the solid surface catalyst is an 8 percent nickel stainless steel mesh.

4. Apparatus according to claim 1 in which the solid surface catalyst is an 8 percent nickel stainless steel mesh.

5. Apparatus according to claim 4 in which the means for bringing the nitrogen oxides formed by burning ammonia into contact with a solid surface catalyst and flowing water includes means for applying water to said first stage absorber means at a rate of between 1 gallon for each minute and 20 gallons for each minute.

6. Apparatus according to claim 1 in which the means for bringing the nitrogen oxides formed by burning ammonia into contact with a solid surface catalyst and flowing water includes means for applying water to said first stage absorber means at a rate of between 1 gallon for each minute and 20 gallons for each minute.

7. Apparatus according to claim 6 in which the first stage absorber means has a height of between 5 and 15 feet and a diameter of between 9 and 18 inches.

8. Apparatus according to claim 1 in which the solid surface catalyst is a catalyst of the type having a binding force with nitrogen oxide that is sufficient to prevent it from being washed away but insufficient to prevent oxidation of nitrogen oxide to nitrogen dioxide and insufficient to prevent the removal of nitric acid from the surface by water.

9. Apparatus for nitrogeneous fertilizing in accordance with claim 1 in which said first-stage absorber means including a plurality of tray means adapted to hold said solid surface catalyst to control the amount of water above said tray means and the flow of water through said tray means.

10. Apparatus for nitrogeneous fertilizing comprising;
    an anhydrous ammonia tank containing ammonia;
    burner means for oxidizing between 12.5 pounds and 146 pounds of nitrogen each hour in a continuous process by burning ammonia;
    ammonia conduit means connecting said anhydrous ammonia tank containing ammonia and said mixer means;
    ammonia valve means within said ammonia conduit means for restricting the flow of anhydrous ammonia between said anhydrous ammonia tank and said mixer means to a range of between 12.5 pounds and 146 pounds of nitrogen each hour;

mixer gas conduit means connecting said mixer means and said burner means for supplying a mixture of anhydrous ammonia and air to said burner means;

said burner means including a catalyst capable of sustaining burning of ammonia and air after ignition;

first-stage absorber means containing a first packing;

said first packing including a solid surface catalyst for aiding reactions between ammonia oxides and air;

means for supplying water to said first-stage absorber means;

first oxide conduit means communicating with said burner means and said fist-stage absorber means for permitting the flow of the products of combustion from said burner means to said first-stage absorber means;

means for bringing the nitrogen oxides formed by burning the ammonia into contact with the solid surface catalyst and flowing water in the first-stage absorber means in continuous process as the nitrogen oxides are formed to form a dilute solution of nitric acid in a continuous stream;

filter inlet means for permitting air to enter said first-stage absorber means at a rate to provide a molar ratio of oxygen to nitric oxides of at least 2 to 1;

second-stage absorber means adapted to hold a second packing material;

means communicating with said first-stage absorber means and said second-stage absorber means for moving nitrogen oxides from said first-stage absorber means to said second-stage absorber means;

conduit means for applying ammonium nitrite and ammonium nitrate solutions are formed;

said conduit means including regulating means for restricting the flow of said ammonium hydroxide to a level that maintains the pH in an absorber tank above 6.7;

stripper-oxidizer means communicating with said first-stage absorber means and second-stage absorber means for receiving said dilute solution of nitric acid and form said first-stage absorber means and ammonium nitrite from said second-stage absorber means; whereby said ammonium nitrite is oxidized to ammonium nitrate; and outlet means from said stripper-oxidizer means whereby nitrate fertilizer solution may be removed therefrom;

said first-stage absorber means including a plurality of tray means adapted to hold said solid surface catalyst and to control the amount of water above said tray means and the flow of water through said tray means;

said solid surface catalyst having surfaces with different attractions to different compounds of nitrogen and oxygen; and said means for bringing the nitrogen oxides formed by burning the ammonia into contact with the solid surface catalyst and flowing water including means for applying water to converter means at a rate of between 1 gallon for each minute and 20 gallons for each minute.

11. Apparatus according to claim 10 in which the solid surface catalyst includes a nickel alloy mesh.

12. Apparatus according to claim 11 in which the solid surface catalyst is an 8 percent nickel stainless steel mesh.

13. Apparatus according to claim 12 in which the means for bringing the nitrogen oxides formed by burning ammonia into contact with a solid surface catalyst and flowing water includes means for applying water to said first stage absorber means at a rate of between 1 gallon for each minute and 20 gallons for each minute.

14. Apparatus according to claim 13 in which the first stage absorber means has a height of between 5 and 15 feet and a diameter of between 9 and 18 inches.

15. Apparatus according to claim 14 in which the solid surface catalyst is a catalyst of the type having a binding force with nitrogen oxide that is sufficient to prevent it from being washed away but insufficient to prevent oxidation of nitrogen oxide to nitrogen dioxide and insufficient to prevent formation of nitric acid by reaction of water with bound nitrogen dioxide and insufficient to prevent the removal of the nitric acid from the surface by water.

16. Apparatus according to claim 10 in which the first stage absorber means has a height of between 5 and 15 feet and a diameter of between 9 and 18 inches.

17. Apparatus according to claim 10 in which the solid surface catalyst is a catalyst of the type having a binding force with nitrogen oxide that is sufficient to prevent it from being washed away but insufficient to prevent oxidation of nitrogen oxide to nitrogen dioxide and insufficient to prevent formation of nitric acid by reaction of water with bound nitrogen dioxide and insufficient to prevent the removal of the nitric acid from the surface by water.

* * * * *